(12) United States Patent
Bushuev (10) Patent No.: US 9,494,038 B2
(45) Date of Patent: Nov. 15, 2016

(54) BLADED REACTOR FOR THE PYROLYSIS OF HYDROCARBONS

(75) Inventor: Vladimir Andreevich Bushuev, Moscow (RU)

(73) Assignee: Coolbrook Oy, Helsinki (FI)

( * ) Notice: Subject to any disclaimer, the term of this patent is extended or adjusted under 35 U.S.C. 154(b) by 471 days.

(21) Appl. No.: 13/259,345

(22) PCT Filed: Jul. 7, 2009

(86) PCT No.: PCT/RU2009/000339
§ 371 (c)(1),
(2), (4) Date: Sep. 23, 2011

(87) PCT Pub. No.: WO2010/110691
PCT Pub. Date: Sep. 30, 2010

(65) Prior Publication Data
US 2012/0020841 A1    Jan. 26, 2012

(30) Foreign Application Priority Data

Mar. 23, 2009    (RU) .................................. 2009110240

(51) Int. Cl.
*B01J 19/18* (2006.01)
*F01D 5/12* (2006.01)
(Continued)

(52) U.S. Cl.
CPC .................. *F01D 1/12* (2013.01); *B01J 6/008* (2013.01); *B01J 19/0066* (2013.01); *B01J 19/18* (2013.01); *F01D 1/16* (2013.01); *F01D 5/022* (2013.01); *F01D 5/142* (2013.01); *F01D 25/24* (2013.01); *F02C 3/16* (2013.01); *F02C 6/10* (2013.01); *F02C 6/18* (2013.01)

(58) Field of Classification Search
CPC .................................... B01J 19/18; F01D 5/12

USPC ........................................................ 422/129
See application file for complete search history.

(56) References Cited

U.S. PATENT DOCUMENTS

| 1,137,590 A | * | 4/1915 | Ehrhart ........................ 415/57.2 |
| 3,869,220 A | | 3/1975 | Tayler |

(Continued)

FOREIGN PATENT DOCUMENTS

| GB | 1 237 363 A | 6/1971 |
| RU | 2109961 | 4/1998 |
| RU | 2124039 | 12/1998 |

OTHER PUBLICATIONS

International Search Report dated Nov. 12, 2009 for PCT/RU2009/000339.

(Continued)

*Primary Examiner* — Huy-Tram Nguyen
(74) *Attorney, Agent, or Firm* — Fitch, Even, Tabin & Flannery, LLP (57) ABSTRACT

A bladed reactor for pyrolysis of hydrocarbons comprises a rotor with blades that form an axial-flow blade cascade, a fixed torus-shaped hoop that adjoins the tips of the blades, and a housing that encloses the hoop and a rotor periphery so that a passage having a ring shape of its meridian section is formed. One or more partitions are installed in the passage, an inlet port is located directly after each partition while an outlet port is located directly in front of each partition. Nozzle vanes forming a nozzle cascade are installed upstream of the blade cascade, and diffusing vanes forming a diffusing cascade are installed downstream of the blade cascade. There is a vaneless space between the exit from the diffusing cascade and the entry into the nozzle cascade. A group of nozzle vanes arranged directly after each partition may be separated off from the remaining nozzle vanes by a bulkhead so that a channel is formed which connects the corresponding inlet port with separated group of nozzle vanes to simplify the reactor starting.

4 Claims, 6 Drawing Sheets

(51) Int. Cl.

| | | |
|---|---|---|
| *B01J 8/44* | (2006.01) | |
| *B01J 10/00* | (2006.01) | |
| *B01J 12/00* | (2006.01) | |
| *F01D 1/12* | (2006.01) | |
| *B01J 6/00* | (2006.01) | |
| *B01J 19/00* | (2006.01) | |
| *F01D 1/16* | (2006.01) | |
| *F01D 25/24* | (2006.01) | |
| *F02C 6/10* | (2006.01) | |
| *F02C 6/18* | (2006.01) | |
| *F01D 5/02* | (2006.01) | |
| *F01D 5/14* | (2006.01) | |
| *F02C 3/16* | (2006.01) | |

(56) References Cited

U.S. PATENT DOCUMENTS

| | | |
|---|---|---|
| 3,932,064 A | 1/1976 | Tayler |
| 4,134,824 A | 1/1979 | Kamm et al. |
| 4,265,732 A | 5/1981 | Dinulescu |
| 4,279,570 A | 7/1981 | Egli et al. |
| 4,325,672 A | 4/1982 | Sixsmith et al. |
| 4,724,272 A | 2/1988 | Raniere et al. |
| 4,832,822 A | 5/1989 | Bernard et al. |
| 4,978,277 A * | 12/1990 | Moore .................. 415/57.1 |
| 5,300,216 A | 4/1994 | Hertzberg et al. |
| 5,342,170 A | 8/1994 | Elvekjaer et al. |
| 5,389,232 A | 2/1995 | Adewuyi et al. |
| 5,607,558 A | 3/1997 | Ellingsen |
| 6,538,169 B1 | 3/2003 | Pittman et al. |
| 7,232,937 B2 | 6/2007 | Bushuev |
| 7,312,370 B2 | 12/2007 | Pittman et al. |

OTHER PUBLICATIONS

Korean Intellectual Property Office Notification of the Reasons for Rejection dated Jun. 12, 2015 for Korean Application No. 10-2011-7025148 (5 pages), and informal English translation (4 pages).

European Patent Office Extended European Search Report dated Jun. 18, 2015 for European Patent Application No. EP 09 842 387.4 (6 pages).

* cited by examiner

BLADED REACTOR FOR THE PYROLYSIS OF HYDROCARBONS

CROSS REFERENCE TO RELATED APPLICATIONS

This application is a national phase application of International Application No. PCT/RU2009/000339, filed Jul. 7, 2009, claiming priority to Russian Application No. 2009110240, filed Mar. 23, 2009 both of which are incorporated by reference herein in their entirety.

FIELD OF THE INVENTION

The invention relates to apparatuses for thermal pyrolysis of hydrocarbons to produce lower olefins. In the essence of the technical solution, the invention in its other aspect relates to rotary bladed machines.

PRIOR ART

Lower olefins—ethylene, propylene and butylenes, are basic products of petroleum chemistry and serve as raw materials in commercial production of plastics, rubbers, fibers and coatings. In industry, the lower olefins are produced by pyrolysis of hydrocarbon, such as ethane, propane, butane, naphtha or gasoil.

In accordance with the current accepted technology, the pyrolysis is performed in installations consisting of a tubular furnace and a quenching apparatus. A feedstock evaporated and mixed with steam is supplied into a reaction tube located inside a radiant chamber of the furnace. Cracked stream having temperature of 750 to 930° C. are directed through a transfer pipeline to the quenching apparatus where they are rapidly cooled to stop reactions and then is transported to a plant where they are separated into desired products and by-products. Undesirable by-products are hydrogen, methane and especially carbon part of which in the form of soot particles is carried away by a gas stream, but other part forms coke deposits on the walls of both reaction tubes and downstream apparatuses.

Two processes take place simultaneously in reaction zone: the primary pyrolysis reactions resulting in formation of lower olefins and the secondary ones, during which the formed lower olefins are spent to form by-products. Consequently, there is an optimum residence time for each type of raw materials and each combination of a temperature and a pressure in a reaction zone, said time corresponds to maximum yield of desired products in products stream. The rate of primary reactions does not depend on the pressure and rapidly grows with a temperature increase, while the rate of secondary reactions grows more slowly with a temperature increase and it is proportional to a partial pressure of the formed lower olefins. So with increase of the process temperature the optimum residence time quickly decreases. Thus, when naphtha is pyrolized, the optimum residence time decreases in two times when the process temperature increases by each 30 to 35 K.

The dilution of the starting feedstock by steam decreases the hydrocarbon partial pressure which leads to decrease in the rate of secondary reactions and to increase in the yield of the desired pyrolysis products. However, in connection with the need of additional energy consumption, this method has restrictions. For ethane or propane the steam feed usually is: 20 to 40% of the feedstock mass; 25 to 50% for butane; 45-50% for naphtha; and for gas oils the steam feed can be up to 80 to 100% of the feedstock mass.

Other method of increasing the yield of the desired products of the pyrolysis is decrease of residence time at proper increase of the process temperature so that a quantity of heat required to pyrolysis each portion of feedstock should be transferred to it during a shorter time. The necessary increase in a heat transfer rate can be reached by reducing a reaction tube diameter and by increasing a temperature difference between the reaction tube wall and a stream. Structures of tubular pyrolysis furnaces were progressed in this direction approximately till 1985. Tubular furnaces "Millisecond" of the M. W. Kellogg Company became the final point of such a development, a maximum rate of heat transfer to a reaction zone for industrial tubular furnaces was achieved in said furnaces. The process in these furnaces is executed in tubes of 28 to 35 mm in diameter, at temperatures of the outgoing stream about of 900 to 930° C. and at a residence time of about 0.05 to 0.1 sec, wherein a difference between temperatures of the wall and the stream core reaches 120 to 310° C.

Further reduction of the residence time in the tubular pyrolysis furnaces was unprofitable by the following reason. Owing to significant variation of a temperature in a boundary layer adjoining the wall of the reaction tube, an optimum residence time for feedstock particles which move at various distances from this wall is substantially different, so the pyrolysis of a considerable part of feedstock inevitably takes place under conditions which are far away from an optimal ones. Under operating conditions typical in "Millisecond" furnaces, losses of desired products because of a temperature difference in the cross-section of the stream achieve such a value that a further reduction of the residence time becomes inadvisable.

Yields of lower olefins in industrial pyrolysis were practically invariable during the last 20 years, and the yields of ethane per pass are: about of 50 to 52% in the pyrolysis of ethane; 32 to 37% in the pyrolysis of propane and butane; 29 to 36%, in the pyrolysis of naphtha; and 23 to 28% in pyrolysis of gas oil. At the same time, because of increasing the demand for raw hydrocarbon materials, an increase in yields of the desired pyrolysis products becomes more and more actual. Since the causes obstructing the increase in the yields of the desired pyrolysis products in tubular furnaces have a fundamental nature, a state of technology stagnation in which this branch of the petrochemistry is at present can be surmounted by disavowal of using the tubular pyrolysis furnaces only.

There were proposed methods for the pyrolysis of hydrocarbons in apparatuses where a process stream is heated by mixing it with a heated heat carrier without use of heat transfer through walls bounding a reaction zone.

U.S. Pat. Nos. 5,389,232, 6,538,169 and 7,312,370 disclose apparatuses for pyrolysis of hydrocarbon by mixing it with a fluidized stream of heated catalyst particles. However, these apparatuses achieve relatively low yields of ethylene because of impossibility to achieve a short residence time therein.

U.S. Pat. Nos. 4,134,824, 4,724,272 and 4,832,822 disclose apparatuses for the pyrolysis with using a high-temperature gaseous heat carrier. Disadvantages of these reactors are the high contents of CO, $CO_2$ and soot in the product stream. The cause of this is a great temperature difference over the cross-section of the process stream. This method is not used in industrial production of olefins.

There were proposed methods of the pyrolysis wherein a stream of a gaseous reacting medium is heated by conversion of kinetic energy of this stream into heat.

U.S. Pat. No. 5,300,216 discloses an apparatus for the pyrolysis of hydrocarbons in the presence of steam in a stationary shock wave of high intensity. Steam superheated in a tubular furnace to a temperature of about 1000° C. is supplied at a pressure of 27 bar abs. through a supersonic nozzle into a reactor comprising series-positioned mixing and pyrolysis zones. The hydrocarbon feed—ethane—preheated up to approximately 627° C. is supplied through mixers into a supersonic stream of steam. The resulting mixture forms a supersonic stream which has a lower temperature than it needs to initiate at the pyrolysis reactions. A straight compression shock—a stationary shock wave is arranged between the mixing and pyrolysis zones. When passing through this compression shock a kinetic energy of the supersonic stream is converted into heat. Downstream of the compression shock the mixture gets a subsonic velocity and a temperature of about 1000° C. at a pressure of 9 bar abs. The reacting mixture passes the pyrolysis zone for 0.005 to 0.05 sec, while its temperature decreases to about 863° C. due to heat absorption by pyrolysis reactions. 70% conversion of ethane into ethylene is achieved. Products stream passes in heat exchangers, and then passes to gas separation. In this apparatus a temperature difference over the cross-section of the reacting stream is negligible and temperature histories (temperature variation as a function of time) of the passage of all raw material particles through the reactor are identical. However, the steam supply with respect to a hydrocarbon mass must be about 500 to 667%. In this connection, energy consumptions with respect to the produced ethylene are excessively high. This makes the method unsuitable for commercial use at the current interrelation of energy costs with ethylene costs.

U.S. Pat. No. 4,265,732 discloses a bladed reactor for the pyrolysis of hydrocarbons, comprising a rotor with several rows of blades which form axial-flow blade cascades, and a housing having inlet and outlet ports for a medium and enclosing the rotor and stationary vanes. Heat required for the pyrolysis is generated directly inside a process stream because of hydrodynamic drag of the blades. The pyrolysis products are cooled and directed further for gas separation. A temperature difference over the cross-section of the process stream is negligible, and the temperature histories of passage of all flow particles through the reactor are identical. To implement the invention, however, it is necessary to make an axial-flow bladed machine having a very great number of stages (up to 43 stages) with a high circumferential velocity of blades (450 m/sec), wherein the temperature of the stream flowing around a majority blades equals to a maximum pyrolysis temperature (up to 1050° C.). Difficulties which should be overcame when designing such a machine are so great that such machine has not been made.

U.S. Pat. No. 7,232,937 discloses a bladed reactor for the pyrolysis of hydrocarbons, comprising a housing with inlet and an outlet nipples, a cavity of said housing having directing stationary vanes and a rotor with working blades placed therein so that a ring vortex is generated in the cavity when the rotor rotates. Heat required for the pyrolysis is generated directly inside a volume of the reacting medium during hydrodynamic drag of the blades. Pyrolysis reactions go on in the transfer tube which connects the reactor with a quenching apparatus. As a result of intensive mixing, all particles of the flow in the reactor cavity have practically the same temperature; however a duration of residence in this cavity is different for individual particles. Accordingly, the temperature histories of the particles are different in the duration of residence in the reactor cavity. The difference of the temperature histories results in a reduction of the process efficiency as compared with the theoretically possible one. This reactor has a simple construction; however, it is different to provide the reliability thereof since the stream flowing around the working blades has a temperature that equals to a maximum pyrolysis temperature.

Thus, a problem of developing an apparatus suitable for commercial use in the pyrolysis of hydrocarbons, which provides an yield of lower olefins substantially greater than in tubular pyrolysis furnaces, is still undecided. As a result, the persons skilled in the art of petrochemistry are of the opinion that any attempts to improve the modern pyrolysis technology significantly are hopeless.

DISCLOSURE OF THE INVENTION

It is an object of the invention to provide a simple and reliable blade reactor for the pyrolysis of hydrocarbons, in which the yield of lower olefins is more than in tubular pyrolysis furnaces due to the temperature histories of passage of almost all flow particles through the reactor are identical. Other objects and advantages of the invention will become apparent from the description below.

A reactor for the pyrolysis of hydrocarbons is configured as a rotary bladed machine including a rotor with working blades forming an axial-flow blade cascade, and a housing having inlet and outlet ports, said housing enclosing this rotor and stationary vanes.

According to the invention, there is a fixed guide torus-shaped hoop installed in the housing and adjoining tips of the working blades. The housing encloses a rotor periphery and the hoop so that a passage is formed which meridian section has a ring shape. One or several partitions are mounted in the passage symmetrically relative to a rotor axis, said partition(s) defining boundaries of one or several identical working cavities. An inlet port is located directly after each partition in a rotor rotation direction while an outlet port is located directly in front of each partition. The stationary vanes in each working cavity include nozzle vanes forming a nozzle cascade and diffusing vanes forming a diffusing cascade, said nozzle and diffusing cascade located upstream of and downstream from the blade cascade, respectively. There is a vaneless space between an outlet of the diffusing cascade and an inlet of the nozzle cascade. When the rotor rotates, the fluid in each working cavity is forced to move from the inlet port to the outlet port along a helical trajectory, so that flow filaments repeatedly traverse consecutively the nozzle cascade, the blade cascade, the diffusing cascade and the vaneless space. Clearances between the housing and the guide hoop in this vaneless space are sufficient to make the stream velocities small in all points of the vaneless space, and thereby to provide the same pressure at an outlet of the diffuser cascade throughout a length of said cascade.

When the fluid passes through the blade cascade, it gets kinetic energy which then is converted into heat in the diffuser cascade, so that a temperature of the fluid in all similar points of the helical trajectory, including that at the outlet of the nozzle cascade, increases in a direction from the inlet port to the outlet port. When each rotor blade moves along the nozzle cascade, it is flowed around by a stream having a temperature that gradually grows and then falls in a jump manner at a time when the blade passes a partition and enters a next working cavity. A temperature mode of blades is defined by a time-average temperature of the stream flowed around them. This temperature is noticeably less than a maximum temperature of the process stream in the reactor. It is an essential advantage of the reactor of the invention in comparison with the reactors according to U.S. Pat. Nos. 4,265,732 and 7,232,937, in which the temperature of the stream flowed around all or majority blades equals to the maximum temperature of the process stream. Hereupon the reactor of the invention can have the higher reliability and the simpler design.

Pressure equalization in the vaneless space eliminates a pressure difference across a partition, thereby to decrease leakages around the partition and reduce a part of feedstock particles having temperature histories differing from the temperature histories of particles in the main stream. As a result, it is possible to obtain a yield of lower olefins higher than that in tubular pyrolysis furnaces.

According to a first preferable embodiment, the blades have a profile of an impulse turbine blade and they are installed by concave side in a rotor rotation direction, while each working cavity has a bulkhead mounted therein to separate a group of nozzle vanes arranged directly after a partition in the rotor rotation direction from the rest of nozzle vanes in this working cavity. The bulkhead is mounted so that a channel is formed which connects the inlet port with said separated group of nozzle vanes. Such an embodiment provides operation of this separated group of nozzle vanes in a nominal gas-dynamic mode when starting the reactor, while non-stationary flow regimes still take place in the other part of the working cavity, and thus provides the reliable start of the reactor.

According to a second preferable embodiment, geometrical parameters of the nozzle cascade vary in the circumferential direction such that practically the same pressure at an inlet of the blade cascade throughout a length thereof are practically equal and geometrical parameters of the diffusing cascade vary in the circumferential direction such that practically the same pressure at an outlet of the blade cascade throughout a length thereof are practically equal when the reactor operates under nominal conditions. The required changes in the parameters of the nozzle and diffusing cascades can be calculated taking into account a distribution of a temperature and thermal-physical properties of the process stream throughout a length of the working cavity or selected experimentally. Pressure equalization at the inlet to the blade cascade and pressure equalization at the outlet of the blade cascade allow reduction in radial leakages through gaps between the housing and surfaces of a rotor disk. Reduction in the radial leakages additionally allows reduction in a part of feedstock particles which, moving not in the main stream, have temperature histories differing from the temperature histories of particles in the main stream. The result is the possibility to obtain a higher yield of lower olefins.

BRIEF DESCRIPTION OF DRAWINGS

The preferred embodiment of the reactor according to the invention will now be described with reference to drawings given as an example.

DESCRIPTION OF THE PREFERRED EMBODIMENT

A bladed reactor for the pyrolysis of hydrocarbons (FIGS. 1, 2 and 3) includes a rotor consisting of a shaft 1 and a disk 2 with working blades 3 arranged along a periphery of the disk 2. The blades 3 have a profile of a supersonic impulse turbine blade, they are directed radially and are installed by a concave side in a rotor rotation direction, and these blades form an axial-flow blade cascade. The shaft 1 is equipped with a coupler 4 for connection with a drive (not shown) and is mounted in a housing 5 in bearings 6 and 7 using seals 8 and 9.

Figure 1:
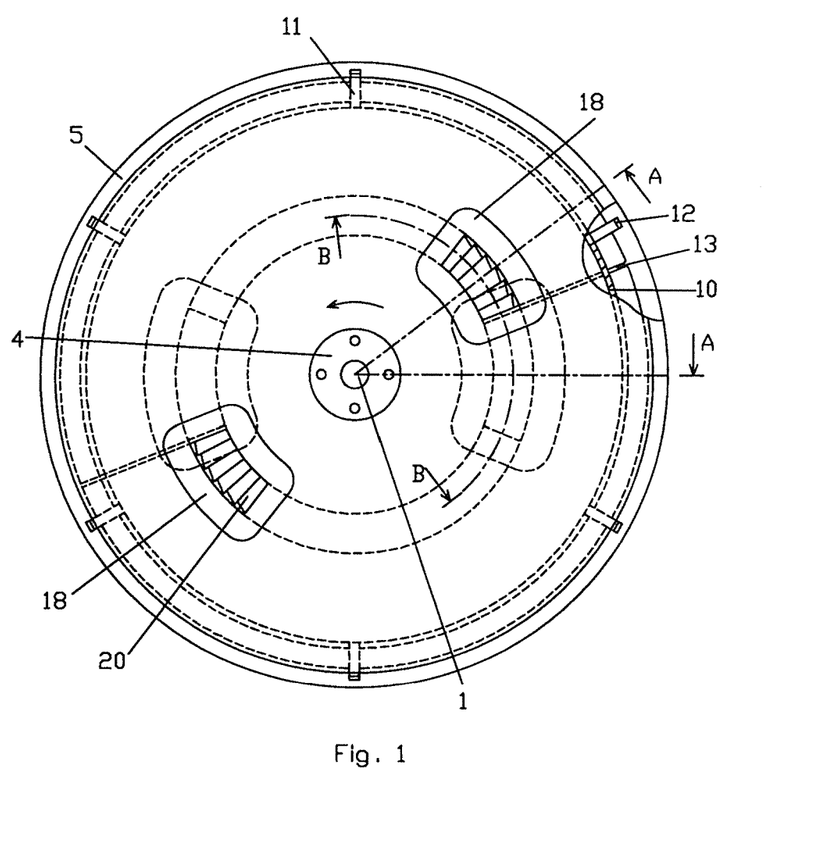
FIG. 1 schematically shows a front view of a reactor having two working cavities.
Figure 2:
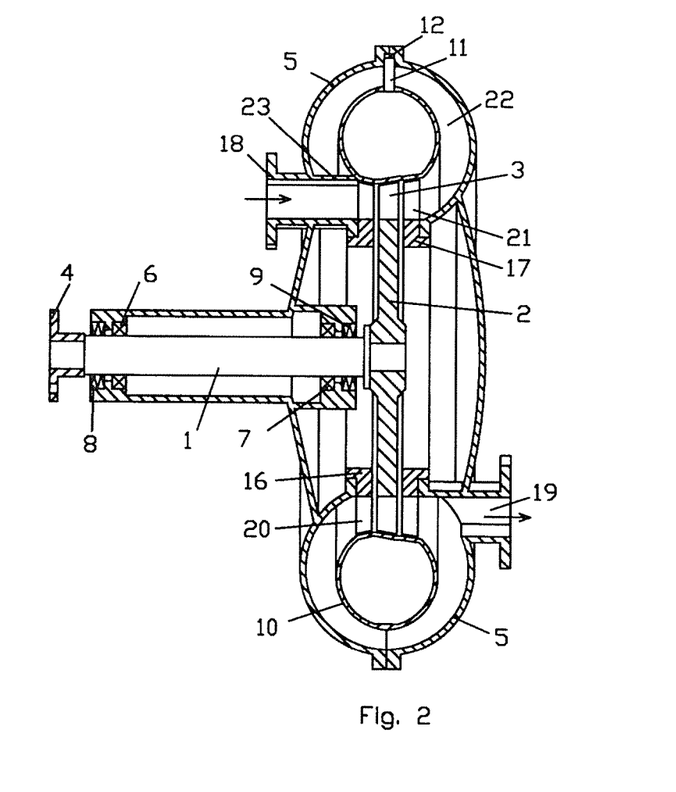
FIG. 2 shows is a section on the line A-A of FIG. 1.
Figure 3:
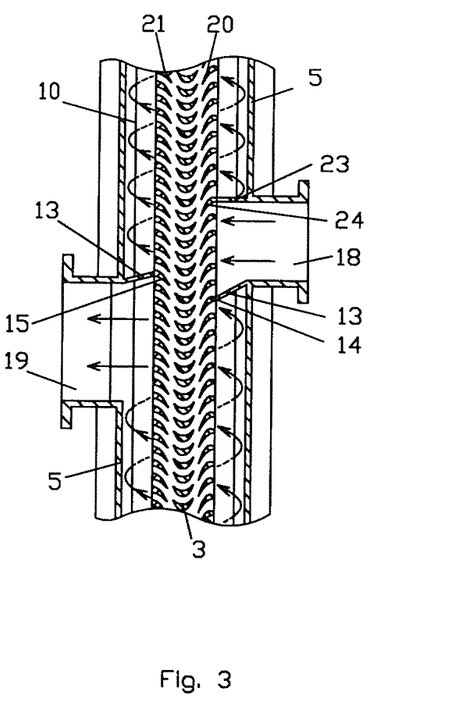
FIG. 3 shows a cylindrical section on the line B-B of FIG. 1.

A fixed guide torus-shaped hoop 10 having a constant cross-section adjoins tips of the working blades 3. The housing 5 encloses the hoop 10 and the disk 2 so that a passage is formed having a constant meridian cross-section. This cross section has a ring shape. The hoop 10 is hollow and is fastened to the housing 5 by means of radial pins 11 fastened in the hoop 10 and entering guide sockets 12 made in the housing 5.

Two partitions are mounted in said passage between the hoop 10 and the housing 5 symmetrically relative to a rotor axis such that two identical working cavities are formed. Each partition consists of a separating wall 13 as well as aft and nose end pieces 14 and 15 which are arranged upstream and downstream relative to the blade cascade, respectively. Edges of the end pieces 14 and 15 are sharp. Here and below the term "sharp edges" means edges having a thickness negligibly small in comparison with a pitch of the blade cascade. The end pieces 14 and 15 are fastened in rings 16 and 17, respectively. The rings 16 and 17 are fastened in the housing 5 with the possibility of adjusting their position in the circumferential direction relative to the rotor axis. An inlet port 18 is arranged after each partition in the rotor rotation direction, while an outlet port 19 is arranged in front of each partition.

Stationary nozzle vanes 20 are arranged in each working cavity upstream of the rotor cascade, said vanes having a curved profile and being fastened in the ring 16 by their convex sides in the rotor rotation direction and forming a nozzle cascade. The stationary diffusing vanes 21 are arranged downstream of the blade cascade, said vanes having a curved supersonic profile, being fixed in the ring 17 by their convex sides in the rotor rotation direction, and forming a diffusing cascade. There is a vaneless space 22 between an outlet of the diffusing cascade and an inlet of the nozzle cascade.

There is a bulkhead being mounted in each working cavity and consisting of a separating wall 23 and an end piece 24 having a sharp edge. This bulkhead separates a group of nozzle vanes arranged directly after a partition in the rotor rotation direction from the rest of nozzle vanes, so that a channel is formed which connects the inlet port 18 with said separated group of nozzle vanes. The end piece 24 is fastened in the ring 16.

In operation, the rotor is rotated counterclockwise as shown in FIG. 1. Both working cavities operate equally. A stream enters the reactor through the inlet port 18 and moves in the working cavity on a helical trajectory whose axis is inside the hoop 10, and said stream repeatedly consecutively traverses the nozzle cascade, the blade cascade, the diffusing cascade and the vaneless space 22. When passing through the blade cascade, the stream gets kinetic energy which then is converted into heat in the diffusing cascade. As a consequence, a temperature of the medium in all similar points of the helical trajectory increases in the direction from the inlet port 18 to the outlet port 19. As a result of pyrolysis reactions, an average molecular mass of the flow in the working cavity decreases in the direction from the inlet port 18 to the outlet port 19.

There is partial mixing of outgoing and ingoing streams in a space between the end pieces 14 and 15. The aft end piece 14 and the nose end piece 15 are displaced in the circumferential direction relatively each other so that mixing of these streams is minimum.

Clearances between the housing 5 and the guide hoop 10 in the vaneless space 22 are sufficiently large to make the stream velocities small in all points of this space, and thereby to provide practically the same pressure at an outlet of the diffusing cascade throughout a length of said cascade.

An operating mode of the nozzle vanes separated by the bulkhead is independent of operating modes of other nozzle vanes in this working cavity. Therefore, a normal gas-dynamic operating mode for said group of the nozzle vanes can be provided always, including the time of putting the reactor into operation when non-stationary flow regimes still exist in the other parts of the working cavity. Thus, a reliable start-up of the reactor is provided.

Geometrical parameters of the nozzle and diffusing cascades vary in the circumferential direction so that when the reactor operates under nominal conditions, practically the same pressure is provided at an inlet to the blade cascade throughout a length thereof and practically the same pressure is provided at an outlet of the blade cascade throughout the length thereof (in detail see below). Pressure equalization at the inlet to the blade cascade reduces radial leakages through a gap between the rotor disk 2 and the ring 16. Pressure equalization at the outlet of the blade cascade reduces radial leakages through a gap between the rotor disk 2 and the ring 17.

Figure 4:
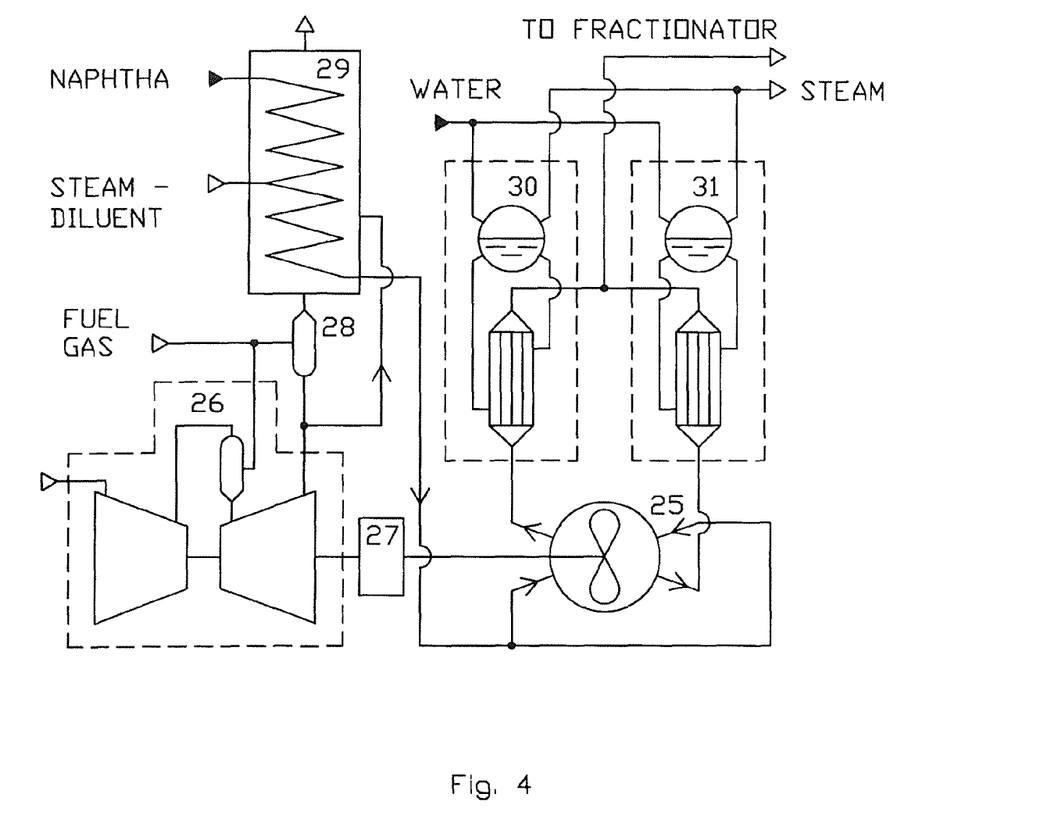
FIG. 4 shows a diagram of a pyrolysis installation that uses the reactor.

FIG. 4 shows a diagram of a naphtha pyrolysis installation including a reactor 25 described in the example, a stationary gas-turbine engine 26 with a reduction gear 27, a combustion chamber 28, a boiler-utilizer 29 and quenching and evaporating apparatuses 30 and 31. Exhaust gases of the gas-turbine engine 26 are divided into two streams, one of which enters a low-temperature part of the boiler-utilizer 29 (an upper part in the diagram), while other stream enters the combustion chamber 28 where it is additionally heated, and just from here it enters a high-temperature part of the boiler-utilizer 29 (a lower part in the diagram).

Naphtha and a steam diluent incoming under a pressure from external sources (not shown in the diagram) are mixed. A resulting steam-feedstock mixture is heated firstly in coils of the low-temperature part of the boiler-utilizer 29 and then is additionally heated in coils of the high-temperature part of this boiler and is supplied into the reactor 25 where pyrolysis is performed. The product stream is cooled in the quenching apparatuses 30 and 31 which have the conventional structure, wherein a cooling water supplying into said apparatuses under a pressure from an external source (not shown in the diagram) is evaporated. The product stream from the quenching apparatuses 30 and 31 is supplied into a gas fractionation plant (not shown in the diagram) where it is separated into desired products and by-products.

The feedstock is naphtha with an average molecular mass of $96.9 \cdot 10^{-3}$ kg/mole. An amount of steam-diluent is 50% of mass of the feedstock. A productive capacity of the installation under normal operating conditions is 15,260 kg of the feedstock per hour. The single-shaft gas-turbine engine 26 has an outlet shaft power of 15 MW with an efficiency of 35.2%.

The material streams in the installation have the following characteristics:

| | |
|---|---|
| Fuel (methane) consumption in the gas-turbine engine (GTE) 26 | 3066 kg/hr |
| Flow rate of exhaust gas of GTE 26 | 49.9 kg/s |
| Temperature of exhaust gases of GTE 26 | 495° C. |
| Flow rate of gases at the outlet of the combustion chamber 28 | 16.5 kg/s |
| Fuel (methane) consumption in the combustion chamber 28 | 194 kg/hr |
| Temperature of gases at the outlet of the combustion chamber 28 | 971° C. |
| Flow rate of the stream through the reactor 25 | 6.36 kg/s |
| Pressure at the inlet to the reactor 25 | 0.215 MPa, abs. |
| Temperature of the flow at the inlet to the reactor 25 | 574° C. |
| Pressure at the inlets of quenching apparatuses 30 and 31 | 0.215 MPa, abs. |
| Temperature of the flow at the inlets to the quenching apparatuses 30 and 31 | 868° C. |
| Pressure at the outlets of the quenching apparatuses 30 and 31 | 0.160 MPa, abs. |
| Temperature of the flow at the outlets of the quenching apparatuses 30 and 31 | 380° C. |

The reactor 25 has the following characteristics:

| | |
|---|---|
| Number of working cavities | 2 |
| Radius of the rotor on the average section of blades | 0.502 m |
| Number of blades | 156 |
| Frequency of rotor rotation | 4,837 rpm |
| Circumferential velocity on the average section of blades | 254.3 m/s |
| Pressure in vaneless spaces | 0.200 MPa, abs. |
| Pressure at the inlet to the rotor cascade | 0.098 MPa, abs. |
| Pressure at the outlet of the rotor cascade | 0.098 MPa, abs. |

Figure 5:
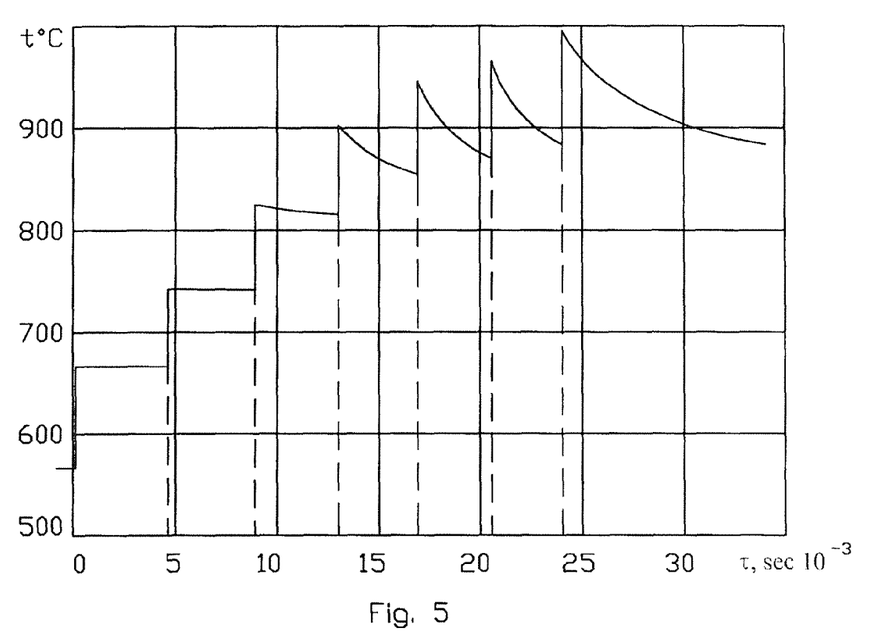
FIG. 5 shows a graph demonstrating a temperature history of a raw material particle passing through the reactor in a main stream.

FIG. 5 is a temperature history of flow particles moving in a main stream.

For a time of residence inside the reactor, the process stream passes through the blade cascade seven times and is subjected to the jump heating during each passage. The dotted line marks the time moments when the stream passes the cascades (durations of said passings are not shown in view of their small values). Time intervals between the consequent temperature jumps are gradually reduced from $4.65 \cdot 10^{-3}$ s between the first and second jumps to $3.66 \cdot 10^{-3}$ s between the sixth and seventh jumps. The residence time, i.e. transit time of flow particles moving in the main stream from the inlet port 18 of the reactor 25 to entry into the quenching apparatus, is of $36 \cdot 10^{-3}$ s. An elevation of the flow temperature occurs in stationary compression shocks of high intensity inside the diffusing cascade. A reduction of the flow temperature occurs due to absorption of heat by pyrolysis reactions when the flow traverses the vaneless space. A value of temperature jumps gradually increases from 79° C. in the first pass up to 105° C. in the last seventh pass. A sum of temperature jumps for all seven passes is 637° C. A maximum temperature of the reacting medium—985° C.—is achieved at the outlet of the diffusing cascade during the seventh pass.

Figure 6:
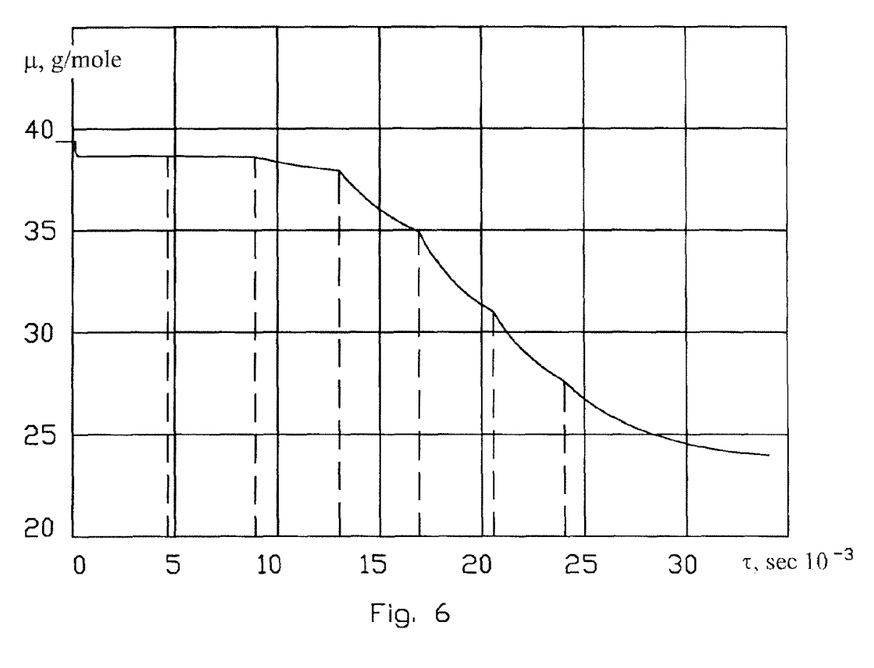
FIG. 6 shows a graph of a changing in an average molecular mass of a fluid passing through the reactor.

The graph (FIG. 6) shows a variation in an average molecular mass of the fluid for a time of its residence in the reactor. The dotted line marks the time moments when the stream passes the cascades (durations of said passes are not shown in view of their small values). During the first pass of the stream through the blade cascades, the average molecular mass is reduced from $38.29 \cdot 10^{-3}$ kg/mole, which corresponds to a composition of the steam-feedstock mixture at the inlet to the reactor, to $37.49 \cdot 10^{-3}$ kg/mole resulted from mixing with leakages, and after that is smoothly decreased as a result of pyrolysis reactions. The average molecular mass of the pyrolysis products at a time moment of entering the quenching apparatus is $22.27 \cdot 10^{-3}$ kg/mole.

The nozzle and diffusing cascades in each working cavity are composed of seven sections so that each next pass of the medium takes place in the next section. As a result, all stream filaments forming the flow in each said section have the same preceding temperature history and, consequently, the same temperature and the same average molecular mass. The temperatures of the flow at the inlet to the nozzle cascade ($t_0$) and at the inlet to the blade cascade ($t_1$) are given in Table I.

TABLE I

| | Section | | | | | | |
|---|---|---|---|---|---|---|---|
| | 1 | 2 | 3 | 4 | 5 | 6 | 7 |
| $t_0$, ° C. | 574.0 | 664.8 | 745.2 | 819.5 | 854.8 | 868.1 | 881.2 |
| $t_1$ ° C. | 538.0 | 626.8 | 705.3 | 775.3 | 804.5 | 810.4 | 815.6 |

Thus, the flow goes to the rotor blades with a temperature smaller than the temperature of the flow in the vaneless space where pyrolysis reactions take place. The temperature of the fluid flowing around the blades cyclically varies at a frequency of 161 Hz, therefore, a temperature mode of the blades is determined by a time-average temperature of said fluid, which is $\bar{t}_1=738°$ C. In the result of gas-dynamic heating of a boundary layer, the temperature of the uncooled blades is of 827° C. that is quite allowable for blades fabricated of high-temperature alloys.

The geometrical parameters of both the nozzle cascade and the diffusing cascade within each section are constant and differ from respective parameters of said cascades in other sections. An angular dimension of the first section determines a bulkhead position (values (z) and ($s_s$) in each section are the same for the nozzle and diffusing cascades).

Angular dimensions of sections ($\Delta$), a number (z) of vane channels and a circumferential pitch ($s_s$) on a middle cross-section of the vanes are given in Table II.

TABLE II

| | Section | | | | | | |
|---|---|---|---|---|---|---|---|
| | 1 | 2 | 3 | 4 | 5 | 6 | 7 |
| A, deg. | 20.24 | 22.72 | 23.83 | 25.14 | 27.12 | 29.34 | 31.61 |
| z | 6 | 6 | 6 | 7 | 7 | 8 | 8 |
| $s_s$, mm | 29.56 | 33.18 | 34.80 | 31.47 | 33.94 | 32.13 | 34.62 |

Both the nozzle cascade and the diffusing cascade have 48 vane channels in each working cavity.

Figure 7:
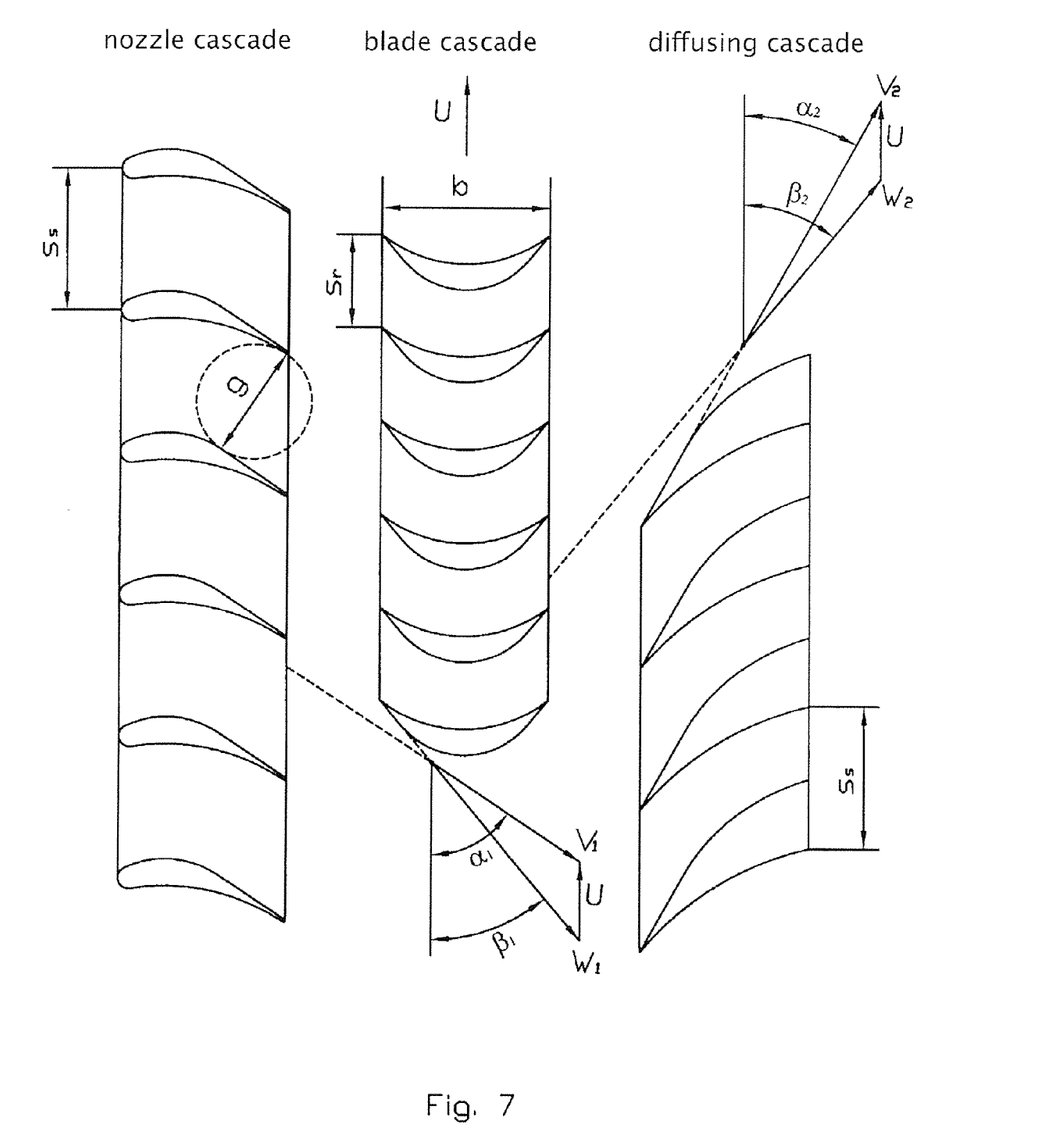
FIG. 7 shows shapes of profiles and channels of blade and vane cascades and triangles of velocities in the reactor.

FIG. 7 shows shapes of profiles and channels of the nozzle cascade, of the blade cascade and of the diffusing cascade and appropriate triangles of the flow velocities at the entry into and at the exit from the blade cascade in reactor on example of realization if invention The nozzle vanes have a curved profile, the vane channels are constricting, and the trailing region of suction side of vane profile is straight up to throat of the vane channel. Height of nozzle vanes on the trailing edge is of 83 mm.

The blade cascade consists of supersonic blades of impulse type. The leading and the trailing edges of the blades are sharp, the throat of blade channel is located in middle part of the channel, leading region of suction side of the blades is straight and has an inclination angle $\beta_1=34°$ (here and hereinafter all angles are measured with respect to in plane which is normal to rotor axis). A height of the blades on the leading edge is 83 mm on the trailing edge is 91 mm. A circumferential pitch of the blade cascade on a middle cross-section of the blades is $s_r=20.22$ mm. A width of the blade cascade is b=38 mm.

The diffusing cascade consists of supersonic compressor vanes having a curved profile. The leading edges of the diffusing vanes are sharp, suction side of the profile has a straight leading region. A height of the diffusing vanes on the leading edge is of 91 mm and on the trailing edge is of 95 mm.

A relative velocity of flow at the entry into the blade cascade is supersonic, an axial component of that velocity is subsonic. An angle of inlet flow to the plane of the blade cascade is equal to an inclination of the leading region of suction side of blades (i.e. 34°). Flow parameters at the entry into the blade cascade in each section are given in Table III. over sections are given in Table III. In this Table: $\alpha_1$ is a sound velocity; $V_1$ is an absolute velocity of the flow; $\alpha_1$ is an angle of the absolute flow; $W_1$ is a flow velocity relative relative to blade; $M_{V1}=V_1/\alpha_1$, $M_{W1}=W_1/\alpha_1$ are Mach numbers; and $\bar{g}=g/s_s$ is throat-pitch ratio (g is a width of the vane channel throat).

TABLE III

| | Section | | | | | | |
|---|---|---|---|---|---|---|---|
| | 1 | 2 | 3 | 4 | 5 | 6 | 7 |
| $\alpha_1$, m/s | 433.1 | 461.4 | 481.4 | 504.3 | 538.3 | 578.2 | 618.7 |
| $V_1$, m/s | 504.6 | 541.9 | 568.8 | 597.2 | 635.0 | 678.8 | 723.8 |
| $M_{V1}$ | 1.165 | 1.175 | 1.181 | 1.184 | 1.180 | 1.174 | 1.170 |
| $\alpha_1°$ | 50.37 | 49.21 | 48.48 | 47.78 | 46.94 | 46.09 | 45.33 |
| $W_1$, m/s | 695.0 | 733.8 | 761.5 | 790.9 | 829.7 | 874.6 | 920.5 |
| $M_{W1}$ | 1.605 | 1.590 | 1.582 | 1.568 | 1.541 | 1.513 | 1.488 |
| $\bar{g}$ | 0.7512 | 0.7364 | 0.7266 | 0.7181 | 0.7096 | 0.7011 | 0.6931 |

Thus, equalization of the entry pressure around the circumference of the blade cascade is achieved by reduction of throat-pitch ratio for channels of the nozzle cascade in each next section.

An absolute velocity of flow at the exit from the blade cascade is supersonic; an axial component of said velocity is subsonic. An angle of inlet stream to the plane of the diffusing cascade is equal to an inclination angle of the leading region of suction side of diffusing vanes in respective sections. Flow parameters at the exit from the blade cascade over sections are given in Table IV. In this Table: $\alpha_2$ is a sound velocity; $W_2$ is a flow velocity relative to blade; $\beta_2$ is an angle of inclination exit relative flow; $V_2$ is an absolute velocity of flow; $M_{V2}=V_2/\alpha_2$, $M_{W2}=W_2/\alpha_2$ are Mach numbers; $\alpha_2$ is an angle of inclination of the leading region of suction side of diffusing vane.

TABLE IV

| | Section | | | | | | |
|---|---|---|---|---|---|---|---|
| | 1 | 2 | 3 | 4 | 5 | 6 | 7 |
| $\alpha_2$, m/s | 435.9 | 464.3 | 484.5 | 507.6 | 542.0 | 582.6 | 623.9 |
| $W_2$, m/s | 639.4 | 675.1 | 700.6 | 727.6 | 763.3 | 804.6 | 846.9 |
| $M_{W2}$ | 1.467 | 1.454 | 1.446 | 1.434 | 1.408 | 1.381 | 1.357 |
| $\beta_2°$ | 34.2 | 34.2 | 34.2 | 34.2 | 34.2 | 34.3 | 34.3 |
| $V_2$, m/s | 861.7 | 896.9 | 922.2 | 948.8 | 984.1 | 1024.9 | 1066.6 |
| $M_{V2}$ | 1.467 | 1.454 | 1.446 | 1.434 | 1.408 | 1.381 | 1.357 |
| $\alpha_2°$ | 24.6 | 25.0 | 25.3 | 25.5 | 25.8 | 26.2 | 26.6 |

Thus, equalization of the exit pressure around the circumference of the blade cascade is achieved by increase of the inclination of the leading region of suction side of the diffusing vane in each next section.

Elements having the wide-known structure, for example, seals, heat insulation, an oil system, cooling systems for the housing and rotor parts, supports and fastenings, etc., were not described in the preferred embodiment of the reactor according to the invention, because their embodiments have no effect on operation of the reactor and have no relation to the essence of the invention.

In order to make the person skilled in the art able to implement the invention throughout a whole claimed field, it is necessary to give the following explanations in addition to the preferred embodiment of the reactor described above.

a) It is possible to design the reactors according to the invention for the pyrolysis of any types of hydrocarbon feedstock currently used.

b) It is possible to design the reactors according to the invention having one or several working cavities. Other things being equal, it is preferable that reactors of greater power should have a greater number of working cavities.

c) In the reactors according to the invention, the nozzle cascade can have axial-flow, diagonal-flow or radial-flow configuration. The diffusing cascade can have axial-flow, diagonal-flow or radial-flow configuration as well.

d) It is possible to design the reactors according to the invention in which the flows at the entry into and at the exit from the blade cascade have subsonic or supersonic absolute and relative velocities and axial components of these velocities in any possible combinations.

e) It is possible to design the reactors according to the invention in which the blades of blade cascade and the vanes in the nozzle cascade and diffusing cascade are twisted or untwisted and have profiles constant or variable through the height.

f) A number of passes of the medium through the blade cascade in the reactors according to the invention can be various. Other things being equal, than the higher is the circumferential velocity on the blades or the higher is the temperature of the flow at the inlet port of the reactor, that the smaller number of said passes is required, and vice versa.

g) The reactors according the invention can have no bulkheads mentioned above. In this case, to provide reliable start-up of such rector, the blades must have a compressor-type profile. However, with such embodiment of the reactor, when other things (the mixture composition, the circumferential velocity of blades) being equal, kinetic energy transferred to the process stream during each pass will be lower, and a necessary number of passes of the reacting process stream through the blade cascade will be greater in comparison with the preferred embodiment of the reactor.

h) It is possible to design the reactors according to the invention in which geometrical parameters of the nozzle and diffusing cascades vary in the circumferential direction more gradually than in the described embodiment, in particular so that each next vane and each next vane channel differ from the previous one due to a change in a profile and pitch of the vanes.

i) It is possible to design the reactors according the invention in which geometrical parameters of the nozzle and diffuser cascades are invariable in the circumferential direction. In this case, the pressure at the inlet to the blade cascade and the pressure at the outlet thereof will vary in the circumferential direction. But this causes increase of the radial leakages in gaps between the rotor disk and the housing parts, and in increase of a part of flow particles which move out of the main stream and have the temperature histories differing from temperature history of particles in the main stream. In addition, it is impossible to provide optimum inlet and outlet angles of flow simultaneously for all stationary vanes and rotor blades in such reactors; because of this, when other things (the mixture composition, the circumferential velocity on blades) being equal, the kinetic energy transferred to the flow by blades decreases and the necessary number of passes of the r process stream through the blade cascade increases. The yield of lower olefins in such reactors may be less than in the reactor described in the preferred embodiment, however this yield can be higher than that in the tubular pyrolysis furnaces.

j) It is possible to design the reactors according to the invention in which the guide hoop and/or the housing have such a shape that an area of the formed passage for the spiral flow of the process stream varies along a length of the working cavity. However, a structure variant described in the embodiment of the invention has technological advantages.

Thereby the invention is not limited to the variant described in the preferred embodiment only, but comprises any modifications and equivalents corresponding to the claims.

INDUSTRIAL APPLICABILITY

At present about 350,000,000 tons of hydrocarbon feedstock are consumed yearly in the world for production of lower olefins. In this connection the reduction of the consumption of feedstock for production of low-molecular olefins is exceedingly desirable. The reactor according to the invention solves this problem. According to the expert estimation, the yield of ethylene per a unit of hydrocarbon feedstock in installations equipped with bladed reactors and operating on naphtha can be increased in 1.5 times (when operating in the "ethylene" mode), while the sums of ethylene and propylene yields can be increased in 1.25-1.3 times in comparison with modern installations equipped with tubular furnaces. If feedstock is petroleum gases the yield of desired products can be increased too.

The particular features of the reactor according to the invention—a rotor with one row of blades, a comparatively small circumferential velocity of the blades, a comparatively small temperature of the blades—provide the structure simplicity and the possibility to fabricate such reactors while the use of existent gas-turbine technologies and existent materials.

Existent industrial gas turbine engines (GTEs) with required accessory can be used as a driver for the reactors according to the invention. The GTEs were designed for the use in gas turbine power stations and they have good ecological characteristics.

Different application conditions can be taken into account when designing the reactors according to the invention. In particular, it is possible to design bladed reactors of greater unit power, blade reactors intended for pyrolysis of specific types of feedstock, reactors having a decreased pressure level in the reaction zone giving higher ultimate yield of desired products and ect.

The invention claimed is:

1. A bladed reactor for the pyrolysis of hydrocarbons, comprising:
    a rotor with blades forming an axial-flow blade cascade; and
    a housing having inlet ports and outlet ports, the housing enclosing the rotor and stationary vanes;
    wherein:
    a fixed torus-shaped guide hoop is in the housing, the hoop adjoining tips of the blades, wherein each of the blades has a profile of an impulse turbine blade, the blades being located near each other and aligned with respect to each other such that the blades pass radially outward from an axis of rotation, the blades being installed by their concave side in a rotor rotation direction and form an axial-flow blade cascade, wherein rings are fastened in the housing and are configured to be adjustable in a circumferential direction relative to the rotor axis, wherein the housing encloses a rotor periphery and the hoop to form a passage with a meridian section having a ring shape;
    one or more partitions are installed in the passage symmetrically relative to a rotor axis, the one or more partitions defining boundaries of one or more identical working cavities, wherein an inlet port is located after each partition in a rotor rotation direction, while an outlet port is located before each partition in the rotor rotation direction;
    the stationary vanes include nozzle vanes forming a nozzle cascade and diffusing vanes forming a diffusing cascade, the nozzle cascade and the diffusing cascade being located in each working cavity upstream and downstream of the blade cascade, respectively, so that a vaneless reaction space is formed between an outlet of the diffusing cascade and an inlet of the nozzle cascade, and wherein geometrical parameters of the nozzle cascade, the blade cascade, and the diffusing cascade are such that when the rotor rotates, fluid in each working cavity is forced to move from the inlet port to the outlet port along a helical trajectory which repeatedly transverses the nozzle cascade, the blade cascade, the diffusing cascade, and the vaneless reaction space; and
    clearances between the housing and the guide hoop in the vaneless reaction space are sufficiently great to provide, when in operation, pressure equalization in the vaneless reaction space, elimination of a pressure difference across said one or more partitions and about the same pressure at the outlet of the diffusing cascade throughout a length of the cascade.

2. The reactor according to claim 1, wherein each working cavity has a bulkhead mounted therein to separate a group of nozzle vanes arranged directly after a respective partition in the rotor rotation direction from other nozzle vanes in the working cavity, so that a channel is formed which connects each inlet port with the respective separated group of nozzle vanes.

3. The reactor according to claim 1, wherein, each nozzle cascade and each diffusing cascade have geometrical parameters which vary in circumferential direction from each inlet port to each outlet port such that when the reactor operates under nominal conditions, provide about the same pressure at an inlet of the blade cascade throughout a length of the blade cascade and about the same pressure at an outlet of the blade cascade throughout the length thereof.

4. The reactor according to claim 2, wherein, each nozzle cascade and each diffusing cascade have geometrical parameters which vary in circumferential direction from each inlet port to each outlet port such that when the reactor operates under nominal conditions, provide about the same pressure at an inlet of the blade cascade throughout a length of the blade cascade and about the same pressure at an outlet of the blade cascade throughout the length thereof.

* * * * *